A. J. FARRELL.
CONVERTIBLE VEHICLE BODY.
APPLICATION FILED OCT. 5, 1918.
1,317,783.
Patented Oct. 7, 1919.
2 SHEETS—SHEET 1.
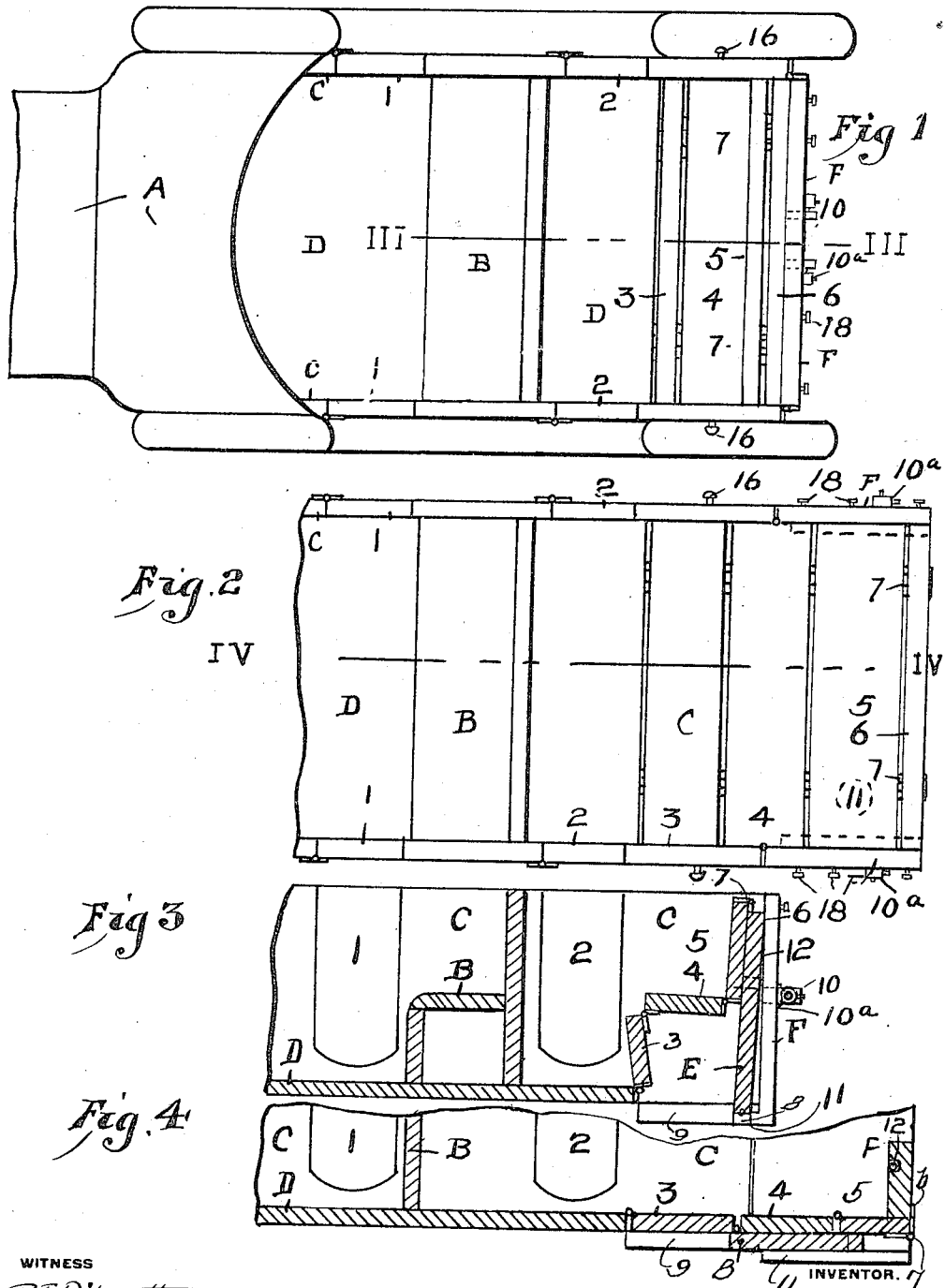

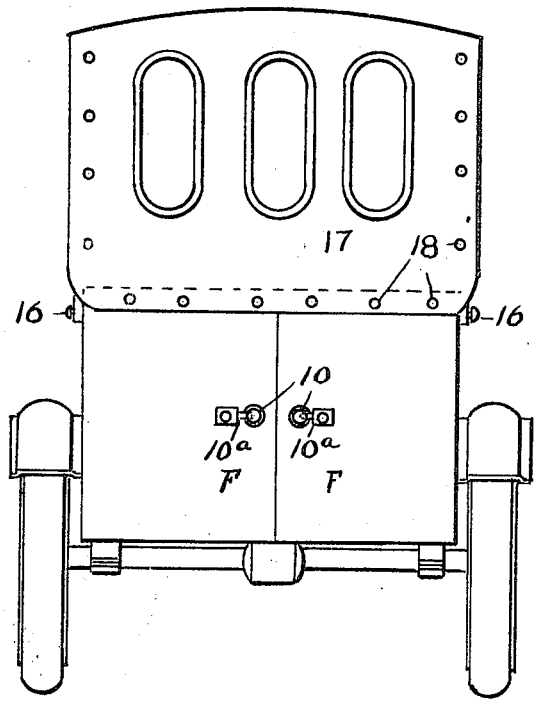
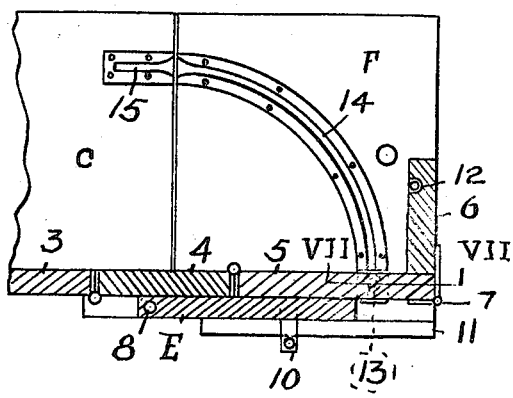
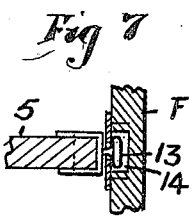

UNITED STATES PATENT OFFICE.

ARTHUR J. FARRELL, OF PITTSBURGH, PENNSYLVANIA.

CONVERTIBLE VEHICLE-BODY.

1,317,783.               Specification of Letters Patent.          Patented Oct. 7, 1919.

Application filed October 5, 1918. Serial No. 256,965.

*To all whom it may concern:*

Be it known that I, ARTHUR J. FARRELL, a citizen of the United States, and residing in the city of Pittsburgh, in the county of Allegheny and State of Pennsylvania, have invented or discovered new and useful Improvements in Convertible Vehicle-Bodies, of which the following is a specification.

My invention consists of a new and improved vehicle body which is convertible from passenger to goods carrying uses, and vice versa.

The object in view is the provision of a body of such character, especially adapted for motor cars, which when in one position will present substantially the same appearance as the ordinary four or five passenger touring car bodies, while in the other position it forms a convenient light delivery truck.

Other convertible bodies have been designed, but an objection to many of the same has been that when converted to passenger-carrying, some striking characteristic or feature is present, which mars the looks of the vehicle and gives it a makeshift appearance. Again others of such convertible bodies are provided with detachable parts which are installed or mounted in place, when the car is used for passenger carrying, with the intention of concealing the hybrid character of the body and to more closely simulate the appearance of an ordinary touring car. This is very objectionable, as these parts are laid away in the garage when not used, and in case it is desired to change the truck into a passenger car away from home, the parts are not at hand. Or, if carried around with the truck, the parts take up valuable room, and soon become damaged or lost. The result is usually that the convertible feature is abandoned, and the car remains solely either a truck or a passenger car. Again, previously designed convertible car bodies, for the purposes described, have not permitted the use of the ordinary touring car top.

My improved body may be quickly, and without the use of tools, converted from one purpose to the other, and when in use for either purpose presents substantially the identical appearance of a normal body intended only for the purpose in question. This, without the use of any detachable parts or fixtures. The ordinary touring car top is not disturbed by the addition of my invention to the car.

Novel features of construction and arrangement of parts will appear from the following description.

In the accompanying drawings, Figure 1 is a broken plan view of a motor vehicle body embodying my invention, the same being arranged for passenger carrying and the top omitted; Fig. 2 is a similar view showing the body arranged for use as a delivery truck; Fig. 3 is a longitudinal, central section taken along the line III—III in Fig. 1; Fig. 4 is a similar view taken along the line IV—IV in Fig. 2; Fig. 5 is a rear end view showing the car used for passenger carrying; Fig. 6 is an enlarged detail, sectioned as in Fig. 4, showing the sliding connection between the back board and the doors, and Fig. 7 is a section along the line VII—VII in Fig. 6.

The following is a detailed description of the drawings.

A represents the cowl and hood of the vehicle; B the permanent or fixed front seat structure of the usual type, and 1 the front doors in the sides C. 2 represents the usual rear doors in the sides C, back of the front seat B. The permanent floor D extends back of the front seat to form the foot rest of the passengers in the rear seat when the body is arranged for passenger carrying, as in Figs. 1 and 3, and to form the front floor of the delivery compartment when the vehicle is to be used as a truck, as in Figs. 2 and 4.

The rear seat is formed by a hinged together structure comprising the following elements: 3 is the riser board hinged to the rear edge of the permanent floor D and adapted to extend up vertically therefrom, as shown in Fig. 3, or to extend rearwardly in alinement therewith, as shown in Fig. 4. 4 is the seat board hinged to the other edge of the riser 3 and adapted to extend rearwardly at right angles to the riser, as shown in Fig. 3, or to extend rearwardly in alinement therewith, as shown in Fig. 4. 5 is the seat back board hinged to the rear edge of the seat board 4 and adapted to extend upwardly at right angles to the seat board, as shown in Fig. 3, or horizontally in alinement with said seat board, as shown in Fig.

4. 6 is the end gate hinged by means of hinges 7 to the other edge of the back board 5 and adapted to be swung back and folded against the rear face of said back board, as shown in Fig. 3, or to be turned up at right angles thereto, as shown in Fig. 4.

E is a base board or support whose ends are provided with trunnions 8 journaled in sockets in blocks 9 depending from the sides C. When the board E is extended horizontally, as shown in Fig. 4, its top surface is on a level with the bottom surface of the permanent floor D, supporting the boards 4 and 5. When the rear seat structure is set up, as shown in Fig. 3, the board E extends up in the rear of the back board 5. The board E is permanently attached to the back board 5, as shown, and thus the former supports the latter in the last mentioned position.

F represents a pair of doors which are hinged to the rear ends of the sides C and adapted to be swung either outwardly into alinement with the sides C, as shown in Figs. 2 and 4, or inwardly to close the rear end of the body, as shown in Figs. 1 and 3.

The base board E is provided with slotted studs 10 which extend rearwardly, when the base board is in the position shown in Figs. 3 and 5, through holes in the doors F and are engaged by spring latches 10$^a$ carried by the doors, thus locking the doors F snugly against the base board. The top edges of the doors are on the same level with the top edges of the sides C while the bottoms of said doors extend below the level of the sides, so that the inwardly extending lips or flanges 11 will fit under and support the ends of the base board E when the body is used as a delivery truck, as shown in Fig. 4, and fit under and support the bottom edge of said base board E when the body is used for passenger purposes, as shown in Fig. 3.

The end gate 6 is provided with catch bolts 12 which are shot into sockets in the doors F, when in the position shown in Fig. 4, to support the end gate in its vertical position.

To keep the folding seat structure and the doors F in proper sliding relation, I prefer to provide the ends of the base board E with bolt heads 13 which engage and slide in curved undercut slots 14 on the inner surfaces of the doors F when the doors are open, as in Figs. 4 and 6. Thus the doors are enabled to resist outward strains and do not rattle. When the seat structure is raised and the doors F closed, the bolt heads occupy similar slots 15 in the permanent sides. The adjacent ends of the slots 14 and 15 are widened or flared to permit the bolt head to pass easily.

When the body is arranged for carrying pasengers, as shown in Figs. 1 and 3, the owner may quickly, and without tools, convert the vehicle into a delivery truck, as follows: He unlocks the catches 10$^a$ and swings the doors F outwardly into alinement with the sides C. He then seizes the seat back board 5 and draws the same rearwardly and downwardly, swinging the end gate upwardly out of the way, thus extending the parts 3, 4, and 5 and E into their positions shown in Fig. 4, the base board E resting its ends on the flanges 11 of the doors F and thus supporting the boards 3, 4 and 5 rigidly in alinement with the permanent floor D. The end gate 6 is then turned into a vertical position and its bolts 12 shot into suitable sockets provided in the faces of the doors F.

When it is desired to convert the delivery car into a touring car, the bolts 12 are unstepped from their sockets in the doors F, and the board 5 forced forwardly and upwardly into its position shown in Fig. 3, the elements 3, 4, 5 and E assuming their positions as shown in said figure. The end gate is next swung rearwardly and folded against the back of the board 5. The doors F are now closed and locked to the base board E. It is evident that the base board E firmly supports the structure in its position shown in Fig. 3, thus preventing vibration or tendency to collapse.

This convertible structure in no wise interferes with the use of the usual touring car top, either of the one-man or Ford type. Thus in Figs. 1 and 2, 16 represents the studs at either side of the car upon which the rear top bows are supported. It is evident that the change in the rear seat structure does not disturb the top other than the fact that the rear curtain 17 is buttoned at the bottom onto the studs 18, as shown in Fig. 5, when the rear doors F are closed. This is a very great advantage as any alteration in the structure or arrangement of the top is marked and objectionable.

It is evident from the foregoing that my improved vehicle body may be quickly converted from a delivery body to a passenger body in a moment, without the use of tools, or the installing or removing of extra elements. Its appearance in either form is closely simulated to the normal appearance of a one-use body for the same purpose. It is inexpensive and contains no parts which will readily wear out or become broken.

What I desire to claim is:—

1. In a convertible vehicle body for the purposes described, the combination with the permanent sides and floor of the body of a collapsible seat structure adapted to be elevated into position between said sides or to be extended rearwardly in horizontal alinement with said floor, and a pair of doors hinged to the rear ends of said sides adapted to be swung inwardly to close the rear end of said body when said seat structure is elevated and to be swung outwardly in alinement with said sides when said seat structure is extended horizontally.

2. In a convertible vehicle body for the purposes described, the combination with the permanent sides and floor of the body of a collapsible seat structure adapted to be elevated into position between said sides or to be extended rearwardly in horizontal alinement with said floor, a pair of doors hinged to the rear ends of said sides adapted to be swung inwardly to close the rear end of said body when said seat structure is elevated and to be swung outwardly in alinement with said sides when said seat structure is extended horizontally, and means for supporting said seat structure in either position.

3. In a convertible vehicle body for the purposes described, the combination with the permanent sides and floor of the body of a collapsible seat structure pivotally secured to the rear end of said floor and composed of hinged together elements, such seat structure adapted to be elevated into position between said sides or to be extended rearwardly in horizontal alinement with said floor, a pair of doors hinged to the rear ends of said sides adapted to be swung inwardly to close the rear end of said body when said seat structure is elevated and to be swung outwardly in alinement with said sides when said seat structure is extended horizontally, and means for supporting said seat structure in either position.

4. In a convertible vehicle body for the purposes described, the combination, with the permanent sides and floor of the body, of a collapsible seat structure pivotally secured to the rear end of said floor and composed of hinged together elements, such seat structure adapted to be elevated into position between said sides or to be extended rearwardly in horizontal alinement with said floor, a pair of doors hinged to the rear ends of said sides adapted to be swung inwardly to close the rear end of said body when said seat structure is elevated and to be swung outwardly in alinement with said sides when said seat structure is extended horizontally, and means whereby said seat structure is supported by said doors in either position.

Signed at Pittsburgh, Pa., this 3rd day of October, 1918.

ARTHUR J. FARRELL.

Copies of this patent may be obtained for five cents each, by addressing the "Commissioner of Patents, Washington, D. C."